Dec. 6, 1932.                G. E. COX                1,889,951
                METHOD FOR COOLING CALCIUM CARBIDE
                Filed March 21, 1927        2 Sheets-Sheet 1
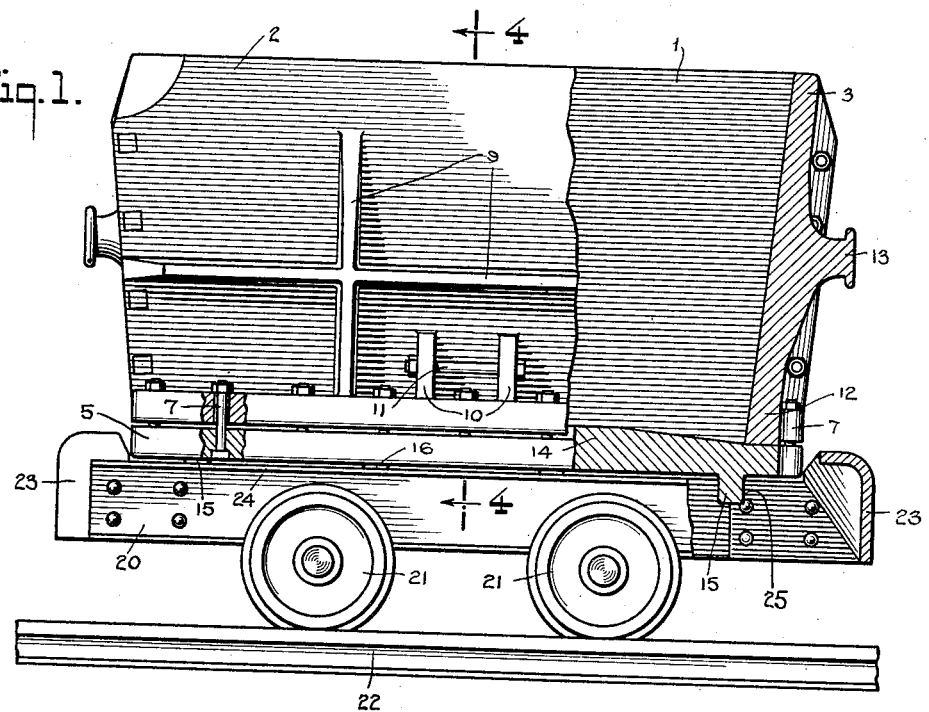
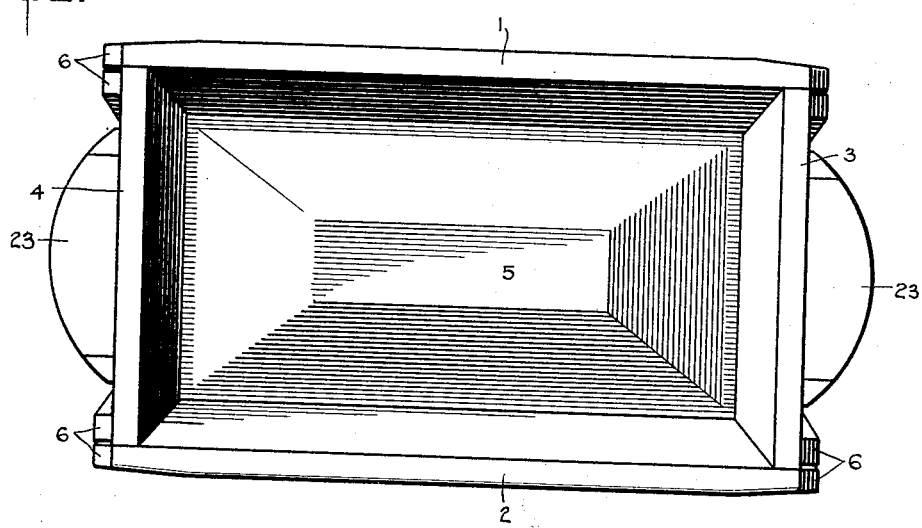
George E. Cox,
INVENTOR
BY
ATTORNEY

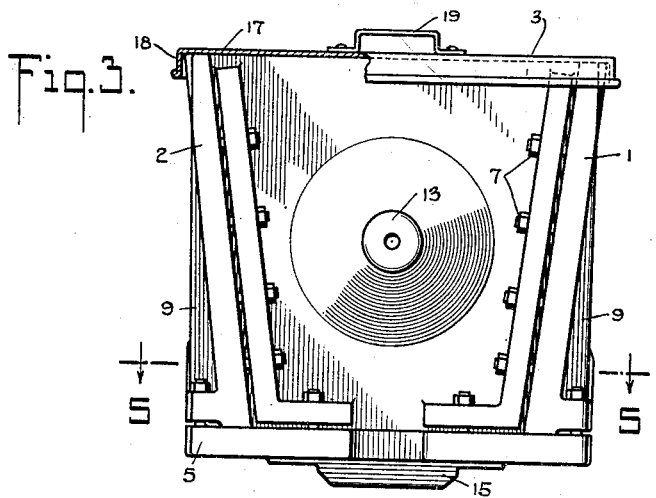
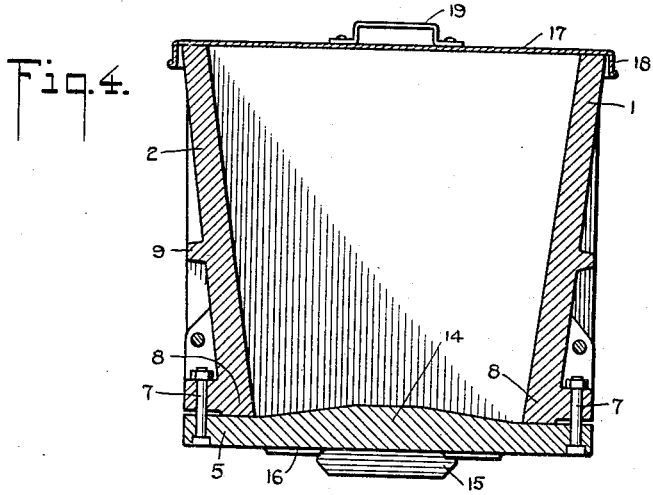
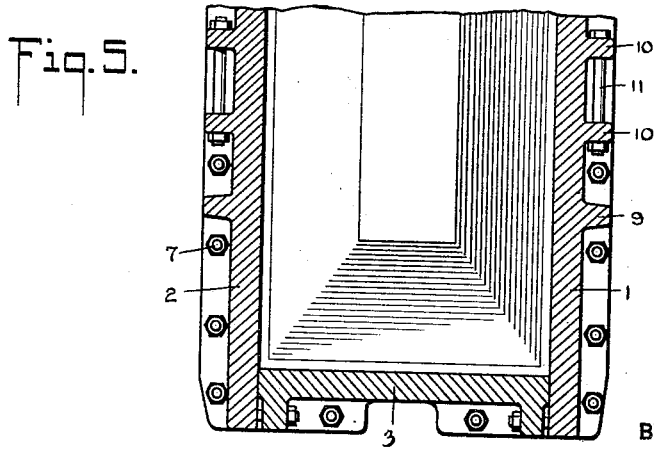

Patented Dec. 6, 1932

1,889,951

UNITED STATES PATENT OFFICE

GEORGE E. COX, OF NIAGARA FALLS, NEW YORK, ASSIGNOR TO AMERICAN CYANAMID COMPANY, OF NEW YORK, N. Y., A CORPORATION OF MAINE

METHOD FOR COOLING CALCIUM CARBIDE

Application filed March 21, 1927. Serial No. 177,022.

This invention relates to the manufacture of calcium carbide and similar materials, more particularly to a method of and an apparatus for improving the quality of the calcium carbide.

As is well known, calcium carbide is generally manufactured in an electric arc furnace into which a mixture of granular coke and lime is fed and is melted by the heat of the arc. The fused mass is removed by tapping the bottom of the furnace and is run into suitable molds or chills where it is cooled and solidified. Generally the molds were shallow, having considerable area exposed to the action of the air or were of small size which also caused relatively large surface area of exposure, the result of which was that the oxygen of the air, acting upon the carbide at a high temperature, combined with the carbon thereof to form carbonaceous gases and leaving lime in the material itself. This reaction took place even after solidification of the mass and the moisture of the atmosphere also reacted with the material with the evolution of acetylene and the further production of residual calcium hydroxide. These reactions produced a layer of decomposed material on top of the carbide in the mold, which layer was often of appreciable thickness. When the mold was shallow and of small size, this layer was an appreciable proportion of the entire amount of carbide made and represented a considerable loss of materials.

The present invention is intended to obviate this difficulty it being among the objects thereof to provide a method of and an apparatus for cooling calcium carbide and the like which will minimize or prevent the deterioration of carbide during the cooling operation by contact with the oxygen and the moisture of the air.

In practicing my invention I utilize an electric furnace as hitherto and produce molten calcium carbide therein but I pour the molten carbide from the furnace into a metal mold or chill of such shape that the area exposed to the action of the air is small compared to the total mass in the mold. Generally the mold is made of considerable depth relative to the width whereby but very little of the carbide is exposed directly to the air. A considerable area of mold surface is exposed to the air so that a fairly rapid radiation of heat takes place resulting in a rapid cooling and solidification of the carbide therein. In order to prevent the action of atmospheric moisture upon the exposed surface of the carbide, I provide a cover for the mold which is placed thereon, either at the time the carbide is poured into the same or at a later stage, preferably the latter. Since the action of the moisture of the air on the carbide takes place only after the material has solidified and has cooled to a temperature below 100° C., it is unnecessary to place the cover thereon as a protection against moisture at an early stage in the cooling but it is usually advisable to allow the surface to be exposed for the purpose of radiation of heat and to give a more rapid cooling before placing the cover thereon for the later stage of cooling.

I have found that a mold made up in sections has advantages over a mold cast in one piece. I therefore provide a mold which consists essentially of a bottom member and four side members which are bolted to each other and to the bottom. The bottom is formed with a thicker central portion and a thinner outer portion, and the sides are made heavier at the lower ends than at the upper ends thereof. To facilitate removal of the solidified mass of calcium carbide from the mold, I make the interior of the mold of an inverted pyramidal shape so that the side of the mold taper upwardly and outwardly. I form trunnions on the two ends thereof whereby the mold may be raised by suitable chains or other devices placed on the trunnions and means are provided for tipping the mold, the trunnions constituting the axis of rotation thereof.

In the accompanying drawings constituting a part hereof, and in which like reference characters indicate like parts:

Figure 1 is a side elevational view of a mold made in accordance with this invention, some parts being shown broken away and other parts being shown in section for clearness:

Figure 2 is a top plan view thereof:

Figure 3 is an end elevational view thereof:

Figure 4 is a vertical cross-sectional view taken along the line 4—4 of Figure 1, and Figure 5 is a fragmentary, horizontal, cross-sectional view taken along the line 5—5 of Figure 3.

The mold consists essentially of side members 1 and 2 and end members 3 and 4 fitting therebetween and resting upon the bottom 5 thereof. The sides, ends and bottom are provided with flanges 6 and bolts 7 passing through said flanges, holding the several sections in rigid relation, forming a unitary structure. The lower portions 8 of the side and end members are considerably thicker than the upper portions thereof and ribs 9 are provided in the side members 1 and 2 to strengthen the same. A pair of ribs 10 are formed in the central lower part of each of the sides 1 and 2 and bolt 11 passing therethrough provides means for aiding in tipping the mold, as explained below. The end members 3 and 4 are provided with thicker lower portions 12 and with trunnions 13 formed approximately in the center thereof. The bottom 5 has the central portion 14 thereof considerably thickened and it is further provided with a pair of depending lugs or tongues 15 and with bosses 16. A cover 17 of sheet metal fits over the top of the mold and has flanges 18 formed on the sides thereof and a handle 19 to facilitate positioning the same on the mold.

A truck for carrying the mold consists essentially of a frame 20 mounted upon wheels 21 adapted to run on tracks 22. The ends 23 of the frame 20 are rounded and serve as bumpers for contacting with similar trucks on the same track. A plate 24 is secured to the top of the frame 20 and has a pair of openings 25 therein for the reception of tongues 15 of the mold, the bosses 16 contacting with the plate and providing a firm seat for the mold.

In the operation of my invention molten calcium carbide is allowed to flow into the mold, which, as will be most clearly seen from Figure 4 is of considerable depth as compared to the width thereof, and has an upper surface exposed to the air which is small compared to the total amount of carbide in the mold. The mold is allowed to cool whereby the calcium carbide first becomes a solid mass and the bright red color thereof fades out because of the rapid radiation of heat from the mass through the metal members of the mold and out into the open air from the surfaces thereof. After the material has cooled to say 200° C., the cover 17 is placed thereon, effectually sealing the mass from the action of the moisture of the air. After the material has been sufficiently cooled, a traveling crane is passed over the mold and chains depending therefrom are placed under trunnions 13 and the mold lifted from the truck. Another chain is placed under bolt 11 and the movement of the mold caused by the movement of the crane tips the same so that the mass of carbide falls therefrom into a suitable hopper from which it passes directly to crushing and pulverizing mills.

Because of the tapered sides of the mold, the removal of the mass of carbide is very simple and practically no hand labor is required because of the action of the chains on the trunnions 13 and the bolt 11. By reason of the thickened portion 14 of the bottom portions 8 of the sides and portions 12 of the ends, the mold is made strongest at the points of greatest strain so that cracking and breaking of the mold parts is to a large extent eliminated. Even if the strain does become too great for any one portion of the mold, only a single section thereof becomes broken and this may be readily replaced because of the removable construction of the mold itself. The molds previously used were cast of a single piece of metal so that upon a crack starting in the mold, the entire mold was necessarily discarded. By practicing my method of cooling calcium carbide the decomposition thereof which was a serious factor in the old method is practically eliminated and the efficiency of the operation is thereby materially increased.

It is apparent that my invention is not limited to the details disclosed above and that numerous variations in the method involved and in the construction of the apparatus may be made within the scope of my invention. For example, the cover 17 may be placed upon the mold immediately after the pouring of the carbide into the same although I prefer to place the cover thereon at a later stage of the cooling. The cover itself need not be of sheet metal and may be made a part of one of the side members or may be hinged or otherwise secured thereto. The proportions of the parts and the dimensions thereof may be changed to a considerable degree with excellent results, it being desirable however to have the depth of the mold great as compared to the width. The flanges 6 may be omitted and other means for holding the several parts of the mold together may be substituted therefor. These and other changes may be made in my invention, the scope of which is defined by the claim appended hereto.

What I claim is:

A method of molding calcium carbide which comprises pouring the molten carbide into a receptacle, the depths of carbide in the receptacle being great relative to the cross section thereof so as to expose only a relatively small area thereof to the air, and allowing the same to solidify.

In testimony whereof, I have hereunto subscribed my name this 12 day of March 1927.

GEORGE E. COX.